(12) United States Patent
You et al.

(10) Patent No.: US 10,162,340 B2
(45) Date of Patent: Dec. 25, 2018

(54) METHOD AND SYSTEM FOR LOT-TOOL ASSIGNMENT

(71) Applicant: TAIWAN SEMICONDUCTOR MANUFACTURING CO., LTD., Hsinchu (TW)

(72) Inventors: Ren-Chyi You, Yilan County (TW); An-Wei Peng, Hsinchu (TW); Chang-Zong Liu, Hsinchu (TW); Jun-Sheng Yeh, New Taipei (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 285 days.

(21) Appl. No.: 14/871,896

(22) Filed: Sep. 30, 2015

(65) Prior Publication Data

US 2017/0090465 A1   Mar. 30, 2017

(51) Int. Cl.
*G05B 19/418* (2006.01)

(52) U.S. Cl.
CPC ......... *G05B 19/41865* (2013.01); *G05B 2219/32266* (2013.01); *G05B 2219/32271* (2013.01); *G05B 2219/45031* (2013.01); *Y02P 90/12* (2015.11); *Y02P 90/20* (2015.11)

(58) Field of Classification Search
CPC .... G05B 19/41865; G05B 2219/32271; G05B 2219/45031; Y02P 90/02; Y02P 90/20
See application file for complete search history.

(56) References Cited

U.S. PATENT DOCUMENTS

| | | | | |
|---|---|---|---|---|
| 2005/0096770 A1* | 5/2005 | Chua | ............... | G05B 19/41865 700/102 |
| 2005/0096782 A1* | 5/2005 | Chen | ............... | G05B 19/41865 700/224 |
| 2007/0179652 A1* | 8/2007 | Weigang | .......... | G05B 19/41865 700/100 |
| 2008/0021585 A1* | 1/2008 | Cheng | ............. | G05B 19/41865 700/99 |
| 2008/0195241 A1* | 8/2008 | Lin | .................. | G05B 19/41865 700/101 |
| 2009/0299510 A1* | 12/2009 | Burda | .................... | G06Q 10/06 700/101 |
| 2009/0326704 A1* | 12/2009 | Chan | ............... | G05B 19/41865 700/121 |
| 2011/0172799 A1* | 7/2011 | Erickson | ................ | G06Q 10/06 700/100 |
| 2013/0190915 A1* | 7/2013 | Choo | ................. | G05B 19/4189 700/113 |
| 2017/0083010 A1* | 3/2017 | Wu | .................. | G05B 19/41865 |
| 2018/0216842 A1* | 8/2018 | Turney | .................... | F24F 11/30 |

* cited by examiner

*Primary Examiner* — Jennifer L Norton
(74) *Attorney, Agent, or Firm* — Maschoff Brennan

(57) ABSTRACT

A method is disclosed and includes determining whether there is any WIP information with one or more process constraints in a process constraint database that is coupled with a manufacturing execution system; determining whether there is a dispatching rule in the dispatching rule database that is coupled with a dispatching system; generating a tool-lot relationship based on at least one of the process constraints and the dispatching rule; utilizing the tool-lot relationship to assign one or more lots to one or more tools respectively.

20 Claims, 3 Drawing Sheets

METHOD AND SYSTEM FOR LOT-TOOL ASSIGNMENT

BACKGROUND

In a semiconductor fabrication process, integrated circuit (IC) devices are formed in sequential layers of material in a bottom-up manufacturing method. The manufacturing process utilizes a wide variety of processing and measuring tools and techniques to form the various layered features including various deposition techniques and thermal growth techniques. The processing tool performs the various processing functions as defined by a recipe for the manufacture of the semiconductor device.

In a wafer fabrication facility (fab), a lot transfer is controlled by automation systems. The methodology to feed work-in-progress (WIP) to tool is by an agent that is periodically and not timely triggered.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
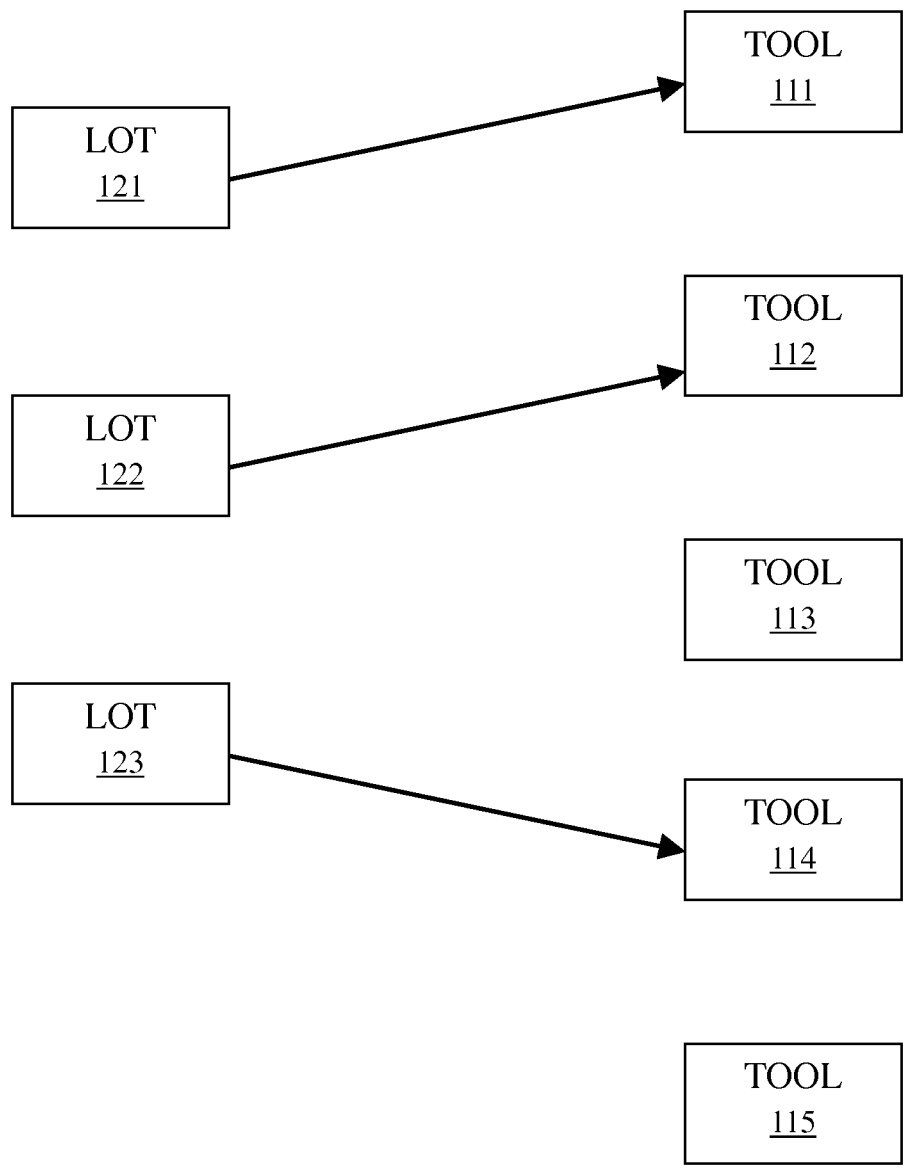
FIG. 1 is a block diagram of tools and lots in accordance with some embodiments of the present disclosure, in which the tool indicates a single chamber or multiple chambers.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Referring to FIG. 1, illustrated is tools 111-115 (e.g., semiconductor-manufacturing equipment) and lots 121-123 in accordance with some embodiments of the present disclosure. It should be noted that FIG. 1 illustrates three lots and five tools. However, the number discussed above is given for illustrative purposes. Various numbers of lots and tools are within the contemplated scope of the present disclosure. A semiconductor integrated circuit (IC) company, such as a semiconductor wafer foundry, provides various IC manufacturing services to customers, through a plurality of manufacturing sites (e.g., fabs). When an object such as lots 121-123 (a batch of wafer in process) is transferred from one manufacturing site to another, cross-facility operations require various processing steps. The tools 111-115 are configured to perform a semiconductor process on the lots 121-123 for semiconductor fabrication.

In some embodiments, semiconductor fabrication involves performing a relatively large number or process steps on a wafer in order to produce a desired semiconductor integrated circuit (IC). The fabrication process is a multiple-step sequence of photolithographic and chemical-processing steps during which electronic circuits are gradually created on a wafer composed of a semiconductor material.

The various processing steps fall into a number of categories including deposition, removal, patterning, and modification of electrical properties (i.e., doping). Deposition is a process that grows, coats, or otherwise transfers a material onto the wafer. Some examples of deposition processes or techniques include physical vapor deposition (PVD), chemical vapor deposition (CVD), electrochemical deposition (ECD), molecular beam epitaxy (MBE) atomic layer deposition (ALD) and the like. Removal is a process that removes material from the wafer in bulk or selectively and includes etching processes. For example, chemical mechanical planarization (CMP) is a typical removal process used between levels of a device. Patterning processes are those that shape or later the shape of deposited materials. Patterning is also referred to as lithography. A typical patterning process includes using a photoresist material to selectively mask portions of the semiconductor device, exposing the device to a particular wavelength of light, and then washing away the unexposed regions with a developer solution. Electrical properties are altered by doping selected regions by diffusion and/or ion implantation. The processes are typically followed by an anneal process, such as a furnace anneal or rapid thermal anneal (RTA) in order to activate the implanted dopants.

Figure 2:
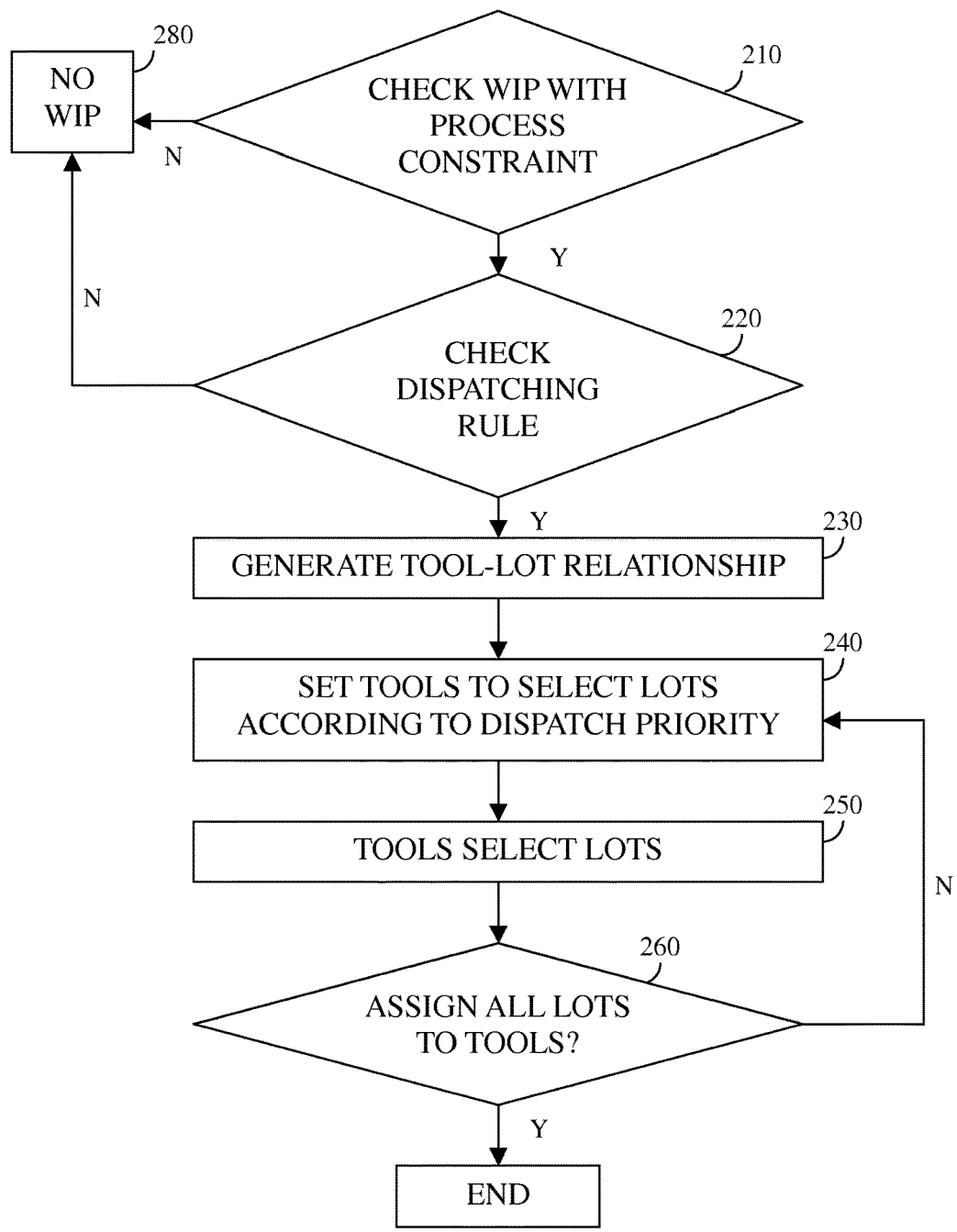
FIG. 2 is a flow chart of a method of assigning the lots to the tools, illustrated in FIG. 1, in accordance with some embodiments.

FIG. 2 is a flow chart of a method 200 of assigning the lots 121-123 to the tools 111-115, illustrated in FIG. 1, in accordance with some embodiments. The method 200 is applicable or readily adaptable to all technology nodes. In FIG. 2, the method 200 includes operation 210, operation 220, operation 230, operation 240, operation 250, operation 260, and operation 280. These operations are not recited in the sequence in which the operations are performed. That is, unless the sequence of the operations is expressly indicated, the sequence of the operations is interchangeable, and all or part of the operations may be simultaneously, partially simultaneously, or sequentially performed.

Aspects of the method 200 are implemented in software, hardware, firmware, or a combination thereof. For example, the various operations of the method 200 are implemented as a computer program product tangibly embodied in a machine-readable storage device for execution by a processing unit. Various operations of embodiments of the method 200 are performed by a computer processor executing a program tangibly embodied on a computer-readable medium to perform functions by operating on input and generating output. The computer-readable medium is, for example, a memory, a transportable medium such as a compact disk, a floppy disk, or a diskette, such that a computer program embodying the aspects of the method 200 are loaded onto a computer. The computer program is not limited to any particular embodiment, and for example, is implemented in an operating system, application program, foreground or background process, driver, or any combination thereof, executing on a single computer processor or multiple computer processors. Additionally, various operations of embodiments of the method 200 provide one or more data structures generated, produced, received, or otherwise implemented on a computer-readable medium, such as a memory.

In operation 210, it is determined that whether there is any WIP information with one or more process constraints in a process constraint database. The process constraint database is coupled with a manufacturing execution system. The manufacturing execution system provides lot information regarding wafers being processed in a fab, and the process constraint database is real-time refreshed by the manufacturing execution system.

In some embodiments, the tools 111-115 and measurement system are operatively coupled to a manufacturing execution system. the manufacturing execution system controls the processing operations in the tools 111-115, the measurement operations in measurement system, as well as additional tools and measurement systems that are configured to perform additional process operations either before, or after any of tools 111-115.

In some embodiments, when a wafer carrier, such as a front opening unified pod, containing wafers is to be transferred, the manufacturing execution system determines to what destination in the fab the wafer carrier should be transferred. This decision is based on production data. The manufacturing execution system provides the process constraints based on consideration for real-time conditions in the fab. For example, the process constraints define a tool-based process limitation based on at least one of a lot head, a lot tail, a part, a route, a recipe, a reticle, a reticle group, a stage, a customer code, a route operation, a start time, and an end time.

If the process constraint database has no WIP information, the operation proceeds to operation 280. If the process constraint database has the WIP information with process constraints, the operation proceeds to operation 220.

In operation 220, it is determined that whether there is a dispatching rule in the dispatching rule database. The dispatching rule database is coupled with a dispatching system.

In some embodiments, the dispatching system makes dispatch decisions and then feed back appropriate information to help improve future dispatch decisions. The dispatching system learns, with feedback, what is occurring in the tools and then changes the dispatch rule based upon that information.

If the process constraint database has no WIP information, the operation proceeds to operation 280. If the process constraint database has the WIP information with process constraints, the operation proceeds to operation 230.

In operation 230, a tool-lot relationship is generated based on at least one of the process constraints and the dispatching rule.

In some embodiments, the WIP information includes lot identification (ID) and tool ID, and the process constraints includes the tool ID, the lot head, the lot tail, the part, the route, the recipe, the reticle, the reticle group, the stage, the customer code, the route operation, the start time, and the end time. For instance, the tool ID of the tool 111 illustrated in FIG. 1 is Tool A, the tool ID of the tool 112 illustrated in FIG. 1 is Tool B, the tool ID of the tool 113 illustrated in FIG. 1 is Tool C, the tool ID of the tool 114 illustrated in FIG. 1 is Tool D, and the tool ID of the tool 115 illustrated in FIG. 1 is Tool E. A table 1 of the process constraints is shown below:

TABLE 1

| tool ID | part | recipe |
|---------|------|--------|
| Tool A  | PA   | RA     |
| Tool B  | PA   | RB     |
| Tool C  | PC   | RC     |
| Tool D  | PB   | RA     |
| Tool E  | PC   | RA     |

In this case, the lot identification of the lot 121 is N111111.00. If the lot information of the lot 121 is part: PC, and recipe: RC. The lot 121 meets the constraint rule of Tool C, so the lot 121 is not processed in the tool 113 (i.e., Tool C), but is processed in other tools 111, 112, 114 and 115 (i.e., Tool A, Tool B, Tool D, and Tool E). A table 2 of the tool-lot relationship based on above process constraints is shown below:

TABLE 2

| lot ID     | tool ID | Run Flag |
|------------|---------|----------|
| N111111.00 | Tool A  | Y        |
| N111111.00 | Tool B  | Y        |
| N111111.00 | Tool C  | N        |
| N111111.00 | Tool D  | Y        |
| N111111.00 | Tool E  | Y        |

In the table 2, the tool-lot relationship between the lot 121 (i.e., N111111.00) and the tools 111-115 (i.e., Tool A, Tool B, Tool C, Tool D, and Tool E) is established. The lot N111111.00 is not processed in Tool C, and the corresponding run flag is 'N'. The lot N111111.00 is processed in any of Tool A, Tool B, Tool D, and Tool E, and the corresponding run flags are 'Y'.

In some embodiments, in operation 230, the tool-lot relationship is based on the dispatching rule. The dispatching system provides the dispatching rule, and the dispatching rule includes dispatching preferences. The dispatching preferences indicate that the tools fed back their preferences for one or more of the lots, in which these preferences depend on processing result, e.g., yield or the like. For instance, a table 3 of the tool-lot relationship based on the dispatching rule is shown below:

TABLE 3

| lot ID     | Tech | tool ID | dispatching preference |
|------------|------|---------|------------------------|
| N111111.00 | N20  | JETRT1  | Y                      |
| N111111.00 | N20  | JETRT2  | N                      |
| N111111.00 | N20  | JETRT4  | Y                      |
| N111111.00 | N20  | JETRT5  | N                      |
| N222222.00 | N16  | JETRT1  | Y                      |
| N222222.00 | N16  | JETRT2  | Y                      |
| N333333.00 | N10  | JETRT1  | N                      |
| N333333.00 | N10  | JETRT4  | Y                      |

In this case, the lot identification of the lot 121 illustrated in FIG. 1 is N111111.00 for the N20 technology node (20 nm process). The lot identification of the lot 122 illustrated in FIG. 1 is N222222.00 for the N16 technology node (16 nm process). The lot identification of the lot 123 illustrated in FIG. 1 is N333333.00 in the N10 technology node (10 nm process). The tool ID of the tool 111 illustrated in FIG. 1 is JETRT1, the tool ID of the tool 112 illustrated in FIG. 1 is JETRT2, the tool ID of the tool 114 illustrated in FIG. 1 is JETRT4, and the tool ID of the tool 115 illustrated in FIG. 1 is JETRT5.

For instance, based on the dispatching rule, the tool 111 (i.e., JETRT1) prefers to run N10/N16/N20, the tool 112 (i.e., JETRT2) prefers to run N16, the tool 114 (i.e., JETRT4) prefers to run N10/N20, the tool 115 (i.e., JETRT5) prefers to run N10/N16. Therefore, the lot 121 (i.e., N111111.00) prefers to run in JETR1/4, not in JETRT2/5; the lot 122 (i.e., N222222.00) prefers to run in JETRT1/2; the lot 123 (i.e., N333333.00) prefers to run in JETRT4.

In some embodiments, in operation 230, the tool-lot relationship is based on both of the process constraints and the dispatching rule. The manufacturing execution system provides the process constraints, where the process constraints at least include constraint rules of the tools. The manufacturing execution system also provides the lot information regarding wafers being processed in the fab. The dispatching system analyzes process information fed back from the tools and decides the dispatching rule. The dispatching system also provides dispatch priority. For instance, a table 4 of the tool-lot relationship based on both of the process constraints and the dispatching rule is shown below:

TABLE 4

| lot ID | tool ID | run flag | dispatching preference | dispatch priority |
| --- | --- | --- | --- | --- |
| N111111.00 | JETRT1 | Y | Y | 1 |
| N111111.00 | JETRT2 | Y | N | 2 |
| N111111.00 | JETRT3 | N | N | 3 |
| N111111.00 | JETRT4 | Y | Y | 4 |
| N111111.00 | JETRT5 | Y | N | 5 |
| N222222.00 | JETRT1 | Y | Y | 1 |
| N222222.00 | JETRT2 | Y | Y | 2 |
| N333333.00 | JETRT1 | Y | N | 1 |
| N333333.00 | JETRT4 | Y | Y | 2 |
| N333333.00 | JETRT5 | N | N | 3 |

In this case, the lot identification of the lot 121 illustrated in FIG. 1 is N111111.00. The lot identification of the lot 122 illustrated in FIG. 1 is N222222.00. The lot identification of the lot 123 illustrated in FIG. 1 is N333333.00. The tool ID of the tool 111 illustrated in FIG. 1 is JETRT1, the tool ID of the tool 112 illustrated in FIG. 1 is JETRT2, the tool ID of the tool 113 illustrated in FIG. 1 is JETRT3, the tool ID of the tool 114 illustrated in FIG. 1 is JETRT4, and the tool ID of the tool 115 illustrated in FIG. 1 is JETRT5.

As to the process constraints in the table 4, the tool 113 (i.e., JETRT3) is incapable of processing the lot 121 (i.e., N111111.00), and the corresponding run flag is 'N'. The tool 115 (i.e., JETRT5) is incapable of processing the lot 123 (i.e., N333333.00), and the corresponding run flag is 'N'.

As to the dispatching preference in the table 4, the lot 121 (i.e., N111111.00) prefers to run in JETR1/4, not in JETRT2/5; the lot 122 (i.e., N222222.00) prefers to run in JETRT1/2; the lot 123 (i.e., N333333.00) prefers to run in JETRT4.

Since the process constraints and dispatching preference are considered, the tool-lot relationships are generated. The tool-lot relationship between the lot 121 (i.e., N111111.00) and any of the tools 111 and 114 (i.e., JETRT1/4) is established. The tool-lot relationship between the lot 122 (i.e., N222222.00) and any of the tools 111 and 112 (i.e., JETRT1/2) is established. The tool-lot relationship between the lot 123 (i.e., N333333.00) and the tool 114 (i.e., JETRT4) is established. It should be noted that if the process constraints and dispatching preference are not considered, lot 123 (i.e., N333333.00) will be assigned to JETRT1 and caused JETRT1 lost due to assignment failure.

Then, the tool-lot relationships are utilized to assign lots 121-123 to the tools 111, 112 and 114 respectively. In some embodiments, in operation 240, the tools 111, 112 and 114 are set to select the lots 121-123 in sequence according to the dispatch priority as shown in above table 4. Therefore, in operation 250, the tool 111 (i.e., JETRT1) selects the lot 121 (i.e., N111111.00), the tool 112 (i.e., JETRT2) selects the lot 122 (i.e., N222222.00), and the tool 114 (i.e., JETRT4) selects the lot 123 (i.e., N333333.00). With reference to FIG. 1, a lot-tool assignment is illustrated, where the lot 121 is assigned to the tool 111, the lot 122 is assigned to the tool 112, and the lot 123 is assigned to the tool 114.

In operation 260, it is determined that whether all lots are assigned to respective tools. If any of the lots is not assigned to the tool, the operation proceeds to operation 240, and the operation 240, operation 250 and operation 260 are repeated in an iterative manner. After all lots are assigned to the tools, as determined in operation 260, the lots are dispatched to the tools by a dispatcher of the dispatching system, or the like. For instance, the dispatcher takes the available lots in buffer and dispatches each lot to an assigned tool. The dispatching system learns, with feedback, what is occurring in the tool and then changes the dispatching rule.

Figure 3:
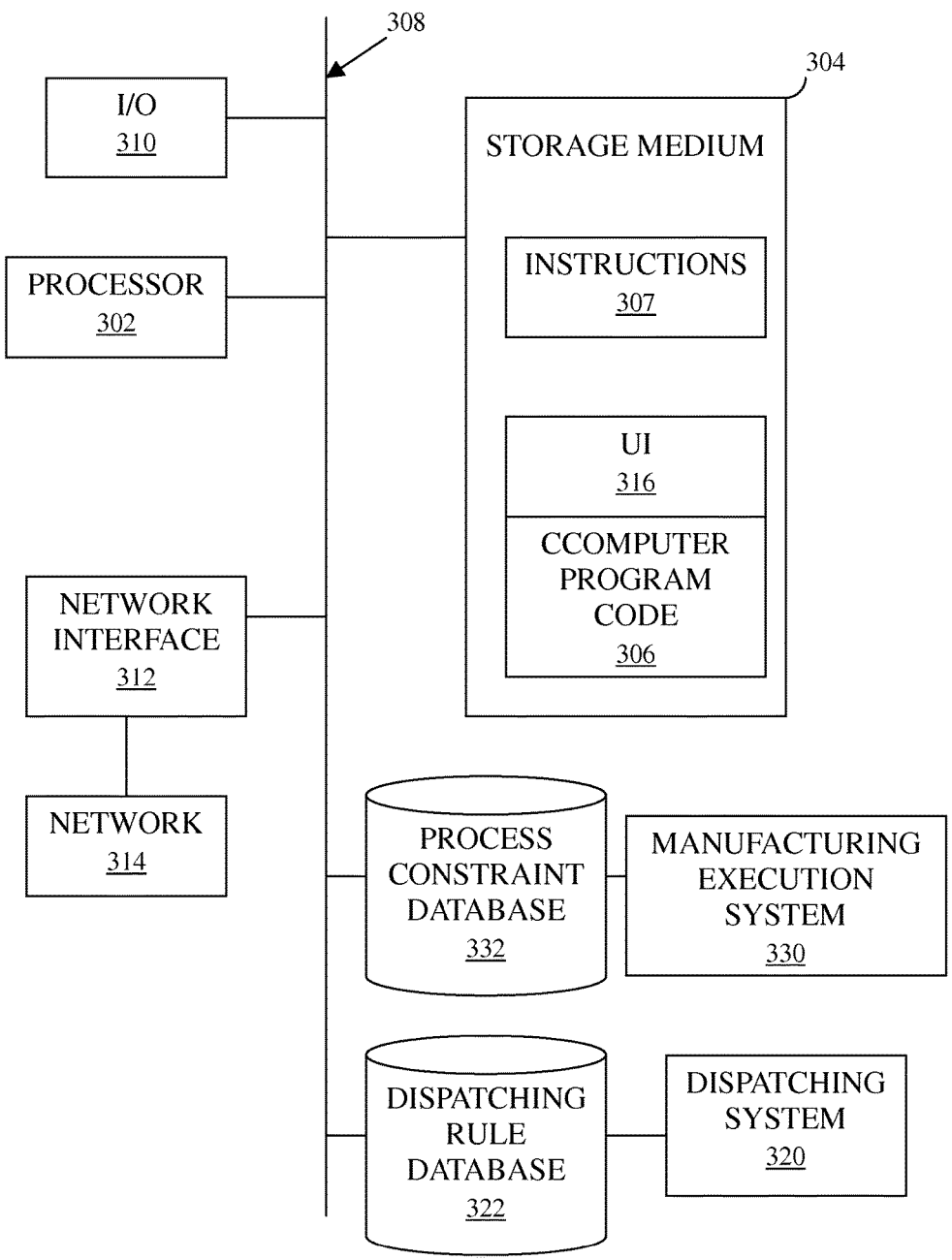
FIG. 3 is a block diagram of a system of assigning the lots to the tools, illustrated in FIG. 1, in accordance with some embodiments of the present disclosure.

FIG. 3 is a block diagram of a system 300 assigning the lots 121-123 to the tools 111-115, illustrated in FIG. 1, in accordance with some embodiments. In some embodiments, the system 300 is a computing device that implements the method 200 of FIG. 2 in accordance with one or more embodiments. The system 300 includes a process constraint database 332 and a dispatching rule database 322. The process constraint database 332 is coupled with a manufacturing execution system 330. The dispatching rule database 322 is coupled with a dispatching system 320.

The manufacturing execution system 330 provides the process constraints based on consideration for real-time conditions in the fab. The manufacturing execution system 330 writes the WIP information with one or more process constraints into the dispatching rule database 322, so that the process constraint database 332 is real-time refreshed by the manufacturing execution system 330. For example, the process constraints define a tool-based process limitation based on at least one of a lot head, a lot tail, a part, a route, a recipe, a reticle, a reticle group, a stage, a customer code, a route operation, a start time, and an end time.

The dispatching system 320 makes dispatch decisions and then feed back appropriate information to help improve future dispatch decisions. The dispatching system learns, with feedback, what is occurring in the tools and then changes the dispatch rule based upon that information. The dispatching system 320 parses and writes the dispatching rule into the dispatching rule database 322, so that the dispatching rule is real-time refreshed by the dispatching system 320.

The dispatching rule database 322 and process constraint database 332 are implemented in software, hardware, or a combination thereof. For example, any suitable non-transitory storage medium may be used for database and include non-volatile memory such as read only memory (ROM), programmable read only memory (PROM), erasable programmable read only memory (EPROM), and electrically erasable programmable read only memory (EEPROM)

devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The system 300 also includes a hardware processor 302 and a non-transitory computer readable storage medium 304 encoded with, i.e., storing, the computer program code 306, i.e., a set of executable instructions. Computer readable storage medium 304 is also encoded with instructions 807 for interfacing with manufacturing machines for producing the semiconductor device. The processor 302 is electrically coupled to the computer readable storage medium 304 via a bus 308. The processor 302 is also electrically coupled to an I/O interface 310 by the bus 308. A network interface 312 is also electrically connected to the processor 302 via the bus 308. The network interface 312 is connected to a network 314, so that the processor 302 and the computer readable storage medium 304 are capable of connecting to external elements via network 314. The processor 302 is configured to execute the computer program code 306 encoded in the computer readable storage medium 804 in order to cause system 300 to be usable for performing a portion or all of the operations as described e.g., in method 200.

In some embodiments, the processor 302 is a central processing unit (CPU), a multi-processor, a distributed processing system, an application specific integrated circuit (ASIC), and/or a suitable processing unit. Various circuits or units are within the contemplated scope of the present disclosure.

In some embodiments, the computer readable storage medium 304 is an electronic, magnetic, optical, electromagnetic, infrared, and/or a semiconductor system (or apparatus or device). For example, the computer readable storage medium 304 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 300 to perform method 200. In one or more embodiments, the storage medium 304 also stores information needed for performing the method 200 as well as information generated during performing the method 200 and/or a set of executable instructions to perform the operation of method 200. In some embodiments, UI 316 is a graphical user interface (GUI).

In some embodiments, the storage medium 304 stores instructions 307 for interfacing with external machines. The instructions 307 enable processor 302 to generate instructions readable by the external machines to effectively implement the method 200 during an analysis.

System 300 includes I/O interface 310. The I/O interface 310 is coupled to external circuitry. In some embodiments, the I/O interface 310 includes a keyboard, keypad, mouse, trackball, track-pad, touch screen, and/or cursor direction keys for communicating information and commands to processor 302.

In some embodiments, the I/O interface 310 includes a display, such as a cathode ray tube (CRT), liquid crystal display (LCD), a speaker, and so on. For example, the display shows information on ranking 324.

System 300 also includes a network interface 312 coupled to the processor 302. The network interface 812 allows system 300 to communicate with network 314, to which one or more other computer systems are connected. The network interface 812 includes wireless network interfaces such as BLUETOOTH, WIFI, WIMAX, GPRS, or WCDMA; or wired network interfaces such as ETHERNET, USB, or IEEE-1394. In one or more embodiments, the method 200 are implemented in two or more systems 300, and information, such as UI 316, are exchanged between different systems 300 via network 314.

One of ordinary skill in the art would recognize that an order of operations in the method 200 is adjustable. One of ordinary skill in the art would further recognize that additional steps are able to be included in the method 200 without departing from the scope of this description.

In some embodiments, a system is disclosed that includes a process constraint database coupled with a manufacturing execution system, a dispatching rule database coupled with a dispatching system, at least one processor, at least one memory including computer program code for one or more programs, the at least one memory and the computer program code being configured to, with the at least one processor, cause the system to: determine whether there is any work-in-progress (WIP) information with one or more process constraints in the process constraint database; determine whether there is a dispatching rule in the dispatching rule database; generate a tool-lot relationship based on at least one of the process constraints and the dispatching rule; utilize the tool-lot relationship to assign one or more lots to one or more tools respectively.

Also disclosed is a non-transitory computer readable medium that includes computer executable instructions for carrying out a method. The method includes determining whether there is any WIP information with one or more process constraints in a process constraint database that is coupled with a manufacturing execution system; determining whether there is a dispatching rule in the dispatching rule database that is coupled with a dispatching system; generating a tool-lot relationship based on at least one of the process constraints and the dispatching rule; utilizing the tool-lot relationship to assign one or more lots to one or more tools respectively.

Also disclosed is a method that includes determining whether there is any WIP information with one or more process constraints in a process constraint database that is coupled with a manufacturing execution system; determining whether there is a dispatching rule in the dispatching rule database that is coupled with a dispatching system; generating a tool-lot relationship based on at least one of the process constraints and the dispatching rule; utilizing the tool-lot relationship to assign one or more lots to one or more tools respectively.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
    a process constraint database coupled with a manufacturing execution system;
    a dispatching rule database coupled with a dispatching system;
    at least one processor; and
    at least one memory including computer program code for one or more programs, the at least one memory and the computer program code being configured to, with the at least one processor, cause the system to:
    determine whether there is any work-in-progress (WIP) information with at least one process constraint in the process constraint database;
    determine whether there is a dispatching rule, wherein the dispatching rule includes a dispatching preference indicating that at least one tool feedbacks a preference for running at least one lot, in the dispatching rule database;
    generate a tool-lot relationship based on the at least one process constraint and the dispatching rule;
    utilize the tool-lot relationship to assign the at least one lot to the at least one tool; and
    process the at least one lot using the at least one tool assigned by the utilization of the tool-lot relationship to manufacture semiconductor devices on at least one wafer in the at least one lot.

2. The system of claim 1, wherein to utilize the tool-lot relationship to assign the at least one lot to the at least one tool comprises setting the at least one tool to select the at least one lot according to a dispatch priority.

3. The system of claim 1, wherein the manufacturing execution system provides the at least one process constraint, the at least one process constraint includes a constraint rule of a first tool of the at least one tool, and to generate the tool-lot relationship comprises:
    when lot information of a first lot of the at least one lot meets the constraint rule of the first tool, to define that the first lot is not processed in the first tool.

4. The system of claim 3, wherein the manufacturing execution system provides the lot information regarding wafers being processed in a wafer fabrication facility (fab).

5. The system of claim 1, wherein the dispatching system analyzes process information fed back from the at least one tool and decides the dispatching rule.

6. The system of claim 1, wherein each of the at least one tool is a semiconductor-manufacturing equipment.

7. A non-transitory computer readable medium comprising computer executable instructions for carrying out a method, the method comprising:
    determining whether there is any WIP information with at least one process constraint in a process constraint database that is coupled with a manufacturing execution system;
    determining whether there is a dispatching rule, wherein the dispatching rule includes a dispatching preference indicating that at least one tool feedbacks a preference for running at least one lot, in a dispatching rule database that is coupled with a dispatching system;
    generating a tool-lot relationship based on the at least one process constraint and the dispatching rule;
    utilizing the tool-lot relationship to assign the at least one lot to the at least one tool; and
    processing the at least one lot using the at least one tool assigned by the utilization of the tool-lot relationship to manufacture semiconductor devices on at least one wafer in the at least one lot.

8. The non-transitory computer readable medium of claim 7, wherein utilizing the tool-lot relationship to assign the at least one lot to the at least one tool comprises:
    setting the at least one tool to select the at least one lot according to a dispatch priority.

9. The non-transitory computer readable medium of claim 7, wherein the manufacturing execution system provides the at least one process constraint, the at least one process constraint includes a constraint rule of a first tool of the at least one tool, and generating the tool-lot relationship comprises:
    when lot information of a first lot of the at least one lot meets the constraint rule of the first tool, defining that the first lot is not processed in the first tool.

10. The non-transitory computer readable medium of claim 9, wherein the manufacturing execution system provides the lot information regarding wafers being processed in a fab.

11. The non-transitory computer readable medium of claim 7, wherein the dispatching system analyzes process information fed back from the at least one tool and decides the dispatching rule.

12. A method comprising:
    determining whether there is any WIP information with at least one process constraint in a process constraint database that is coupled with a manufacturing execution system;
    determining whether there is a dispatching rule, wherein the dispatching rule includes a dispatching preference indicating that at least one tool feedbacks a preference for running at least one lot, in a dispatching rule database that is coupled with a dispatching system;
    generating a tool-lot relationship based on the at least one process constraint and the dispatching rule;
    utilizing the tool-lot relationship to assign the at least one lot to the at least one tool; and
    processing the at least one lot using the at least one tool assigned by the utilization of the tool-lot relationship to manufacture semiconductor devices on at least one wafer in the at least one lot.

13. The method of claim 12, wherein utilizing the tool-lot relationship to assign the at least one lot to the at least one tool comprises:
    setting the at least one tool to select the at least one lot according to a dispatch priority.

14. The method of claim 12, wherein the manufacturing execution system provides the at least one process constraint, the at least one process constraint includes a constraint rule of a first tool of the at least one tool, and generating the tool-lot relationship comprises:
    when lot information of a first lot of the at least one lot meets the constraint rule of the first tool, defining that the first lot is not processed in the first tool.

15. The method of claim 14, wherein the manufacturing execution system provides the lot information regarding wafers being processed in a fab.

16. The method of claim 12, wherein the dispatching system analyzes process information fed back from the at least one tool and decides the dispatching rule.

17. The method of claim 12, wherein each of the at least one tool is a semiconductor-manufacturing equipment.

18. The system of claim 1, wherein the dispatching rule is related to technology node, yield or a state of the at least one tool.

19. The non-transitory computer readable medium of claim 7, wherein the method further comprises:
   after determining whether there is any WIP information with at least one process constraint, analyzing process information fed back from the at least one tool and selecting the dispatching rule based on the process information.

20. The method of claim 12, further comprising:
   after determining whether there is any WIP information with at least one process constraint, analyzing process information fed back from the at least one tool and selecting the dispatching rule based on the process information.

* * * * *